(12) United States Patent
Mackenzie et al.

(10) Patent No.: US 10,225,809 B2
(45) Date of Patent: Mar. 5, 2019

(54) POWER BASED FRAME TIMING SYNCHRONIZATION FOR A TIME-DIVISION DUPLEXING NETWORK

(71) Applicant: British Telecommunications Public Limited Company, London (GB)

(72) Inventors: Richard Mackenzie, London (GB); Anvar Tukmanov, London (GB); Michael Robert Fitch, London (GB); Andrew James Garrett, London (GB); Colin John Harrold, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/300,374

(22) PCT Filed: Mar. 31, 2015

(86) PCT No.: PCT/GB2015/050976
§ 371 (c)(1),
(2) Date: Sep. 29, 2016

(87) PCT Pub. No.: WO2015/150773
PCT Pub. Date: Oct. 8, 2015

(65) Prior Publication Data
US 2017/0150460 A1 May 25, 2017

(30) Foreign Application Priority Data
Apr. 4, 2014 (EP) .................................... 14250069

(51) Int. Cl.
*H04L 5/00* (2006.01)
*H04W 56/00* (2009.01)
(Continued)

(52) U.S. Cl.
CPC .......... *H04W 56/00* (2013.01); *H04B 17/318* (2015.01); *H04L 5/0073* (2013.01);
(Continued)

(58) Field of Classification Search
CPC . H04W 56/00; H04W 52/16; H04W 72/0446; H04W 72/0473; H04L 5/14; H04B 17/318
See application file for complete search history.

(56) References Cited

U.S. PATENT DOCUMENTS 5,689,502 A 11/1997 Scott
6,205,193 B1 * 3/2001 Solve .................... H04W 48/20
370/510

(Continued)

FOREIGN PATENT DOCUMENTS

CN 102347783 A 2/2012
EP 0 917 315 A2 5/1999
(Continued)

OTHER PUBLICATIONS

3rd Generation Partnership Project (3GPP), "3rd Generation Partnership Project; Technical Specification Group Radio Access Network; Evolved Universal Terrestrial Radio Access (E-UTRA); Physical channels and modulation (Release 12)," 3GPP Standard; 3GPP TS 36.211, vol. RAN WG1, No. V12.1.0 (Mar. 18, 2014); pp. 1-120. XP50769984.

(Continued)

*Primary Examiner* — Andrew Lai
*Assistant Examiner* — Chuong M Nguyen
(74) *Attorney, Agent, or Firm* — Amy M. Salmela; Patterson Thuente Pedersen, P.A.

(57) ABSTRACT

This disclosure provides a device and method of aligning a transmission frame in a Time Division Duplexing network, wherein the transmission frame includes a sequence of units
(Continued)

separated by transition points, wherein each unit includes one or more resource slots in a transmission direction, the method comprising: allocating a transmit power level to a plurality of resource slots in a unit, wherein a transmit power for a first resource slot of the plurality of resource slots is greater than the transmit power for a second resource slot of the plurality of resource slots; measuring the transmit power of a TDD transmission received from an external node to determine a peak transmit power of the received TDD transmission; and substantially aligning the first resource slot to coincide with the peak transmit power of the received TDD transmission.

14 Claims, 19 Drawing Sheets

(51) Int. Cl.
  *H04L 5/14* (2006.01)
  *H04B 17/318* (2015.01)
  *H04W 52/16* (2009.01)
  *H04W 72/04* (2009.01)

(52) U.S. Cl.
  CPC .............. *H04L 5/14* (2013.01); *H04L 5/1469* (2013.01); *H04W 52/16* (2013.01); *H04W 72/0446* (2013.01); *H04W 72/0473* (2013.01)

(56) References Cited

U.S. PATENT DOCUMENTS

| | | | | |
|---|---|---|---|---|
| 6,259,685 | B1* | 7/2001 | Rinne | H04W 16/06 370/330 |
| 2002/0031105 | A1* | 3/2002 | Zeira | H04B 1/69 370/337 |
| 2006/0009210 | A1* | 1/2006 | Rinne | H04W 48/12 455/423 |
| 2007/0129094 | A1 | 6/2007 | Jeong et al. | |
| 2008/0056205 | A1* | 3/2008 | Nagai | H04J 4/00 370/336 |
| 2013/0044831 | A1* | 2/2013 | Narasimha | H04W 52/365 375/260 |
| 2014/0161003 | A1* | 6/2014 | Han | H04W 52/146 370/280 |

FOREIGN PATENT DOCUMENTS

| | | | |
|---|---|---|---|
| EP | 0917315 A2 * | 5/1999 | ............ H04L 5/023 |
| WO | WO 98/16031 | 4/1998 | |
| WO | WO 00/22870 | 4/2000 | |
| WO | WO-0022870 A1 * | 4/2000 | ............ H04W 48/20 |

OTHER PUBLICATIONS $3^{rd}$ Generation Partnership Project (3GPP), "3rd Generation Partnership Project; Technical Specification Group Radio Access Network; Study on provision of low-cost Machine-Type Communications (MTC) User Equipments (UEs) based on LTE (Release 12)," 3GPP Standard; 3GPP TR 36.888, vol. RAN WG1, No. V12.0.0 (Jun. 25, 2013); pp. 1-55. XP050692861.

Global TD-LTE Initiative "White Paper on TDD Synchronization" (Jun. 21, 2013); 22 pages.

Huawei et al., "Considerations on further enhancements of Rel-10 eICIC," 3GPP Draft; R1-112037, RAN WG1, Athens, Greece Aug. 22, 2011 (Aug. 17, 2011); 7 pages. XP050537736.

Huawei et al., "Coverage analysis and evaluation on PSS/SSS for low-cost MTC UEs," 3GPP Draft; R1-130885, RAN WG1, Chicago, USA Apr. 15, 2013-Apr. 19, 2013 (Apr. 6, 2013); 2 pages. XP050696886. Retrieved online from http://www.3gpp.org/ftp/tsg_ran/WG1_RL1/TSGR1_72b/Docs/ on Apr. 6, 2013.

Jiang et al., "Cross-subframe co-channel interference mitigation scheme for LTE-advanced dynamic TDD system," Vehicular Technology Conference (VTC Spring), IEEE $77^{th}$ (Jun. 2-5, 2013); 5 pages.

Panasonic, "PSS/SSS position on additional carrier type," 3GPP Draft; R1-122174 (NCT-PSS, SSS Position), RAN WG1, Prague, Czech Republic May 21, 2012-May 25, 2015 (May 12, 2012); 3 pages. XP050600439.

International Search Report for corresponding International Application No. PCT/GB2015/050976 dated May 8, 2015; 5 pages.

Written Opinion for corresponding International Application No. PCT/GB2015/050976 dated May 8, 2015; 8 pages.

International Preliminary Report on Patentability for corresponding International Application No. PCT/GB2015/050976 dated May 8, 2015; 16 pages.

Extended European Search Report for corresponding EP Application No. 14250069.3 dated Sep. 24, 2014; 12 pages.

First CN Search Report for CN. Patent Application No. 2015800179921, dated May 5, 2017, 9 pages (CN Office Action 2 pages; English Translation: 5 pages; 7 total pages).

Second CN Search Report for CN. Patent Application No. 2015800179921, dated Mar. 27, 2017, CN Office Action 3 pages; English Translation: 4 pages; 7 total pages).

* cited by examiner

POWER BASED FRAME TIMING SYNCHRONIZATION FOR A TIME-DIVISION DUPLEXING NETWORK

CROSS-REFERENCE TO RELATED APPLICATIONS

The present application is a National Phase entry of PCT Application No. PCT/GB2015/050976, filed on 31 Mar. 2015, which claims priority to EP Patent Application No. 14250069.3, filed on 4 Apr. 2014, which are hereby fully incorporated herein by reference.

TECHNICAL FIELD

The present disclosure relates to a method and apparatus for minimizing interference between transmissions in a Time-Division Duplexing (TDD) network.

BACKGROUND

Time-Division Duplexing (TDD) networks allow full duplex communication over a single frequency band. This is achieved by allocating a first set of timeslots to transmissions in a first direction (e.g. downlink) and a second set of timeslots to transmissions in a second direction (e.g. uplink). Two or more network nodes may then be configured to send and receive at the appropriate timeslots.

There are significant benefits to utilizing TDD, rather than its Frequency Division Duplexing (FDD) counterpart (which divides uplink and downlink into two frequency bands). For example, a TDD network may allocate a different number of timeslots to either the uplink or downlink directions, such that it may be tailored to asymmetric uplink and downlink data rate demands. FDD networks, on the other hand, do not fully utilize one of the uplink or downlink frequency bands for asymmetric scenarios. Thus, the TDD network offers greater spectrum usage compared to FDD.

A major design consideration when using a TDD network is aligning the uplink and downlink timeslots to avoid interference between transmissions. For example, if two TDD networks (each comprising a basestation and a User Equipment, UE), have both overlapping coverage areas and overlapping uplink and downlink timeslots, then downlink transmissions in the first TDD network would significantly interfere with uplink transmissions in the second TDD network. Therefore, all TDD networks using the same frequency band use a particular frame structure (i.e. a particular sequence of time slots, in which a first portion are allocated for uplink and a second portion are allocated for downlink, separated by transition points) and align the frames such that there are no overlapping uplink and downlink timeslots. This alignment process is known as "synchronization." There are a number of synchronization techniques to minimize the chance of interference.

A first category of synchronization techniques involves the TDD network receiving timing signals over a backhaul connection. Each node in the TDD network may therefore receive the same timing signal from a remote reference clock (a "Primary Reference Time Clock") and synchronize their uplink and downlink timeslots accordingly. Examples of backhaul synchronization include NTP, Synchronous Ethernet (SynchE) and IEEE-1588v2. These techniques provide sub-microsecond synchronization. However, there is an associated backhaul cost, and there are particular requirements specified by each protocol which make them unsuitable for small cell (e.g. femtocell) deployments.

A second category of synchronization techniques involves the TDD network receiving timing signals 'Over-the-Air' (OTA). This category includes both RF signal based techniques and also techniques using Global Navigation Satellite Systems (GNSS). GNSS synchronization can provide extremely accurate timing signals and is widely adopted by macrocell base stations. However, they are not well suited to an indoor deployment scenario (such as small cells), and they have an associated equipment cost for the GNSS processing modules.

OTA synchronization by RF signal based techniques generally relate to network nodes detecting synchronization signals in the network. A network node may then decode a timing signal from the synchronization signal and, after compensating for any propagation delay, may synchronize its downlink and uplink signals accordingly. There are no additional hardware costs involved. However, there are several issues with these techniques. Firstly, they are protocol dependent, so may not work effectively when different network nodes are provided by different network operators (this is particularly relevant for small cells, which will be deployed extensively by different operators and are likely to have overlapping coverage areas). Secondly, remote network nodes may not be able to receive the synchronization signal directly from a macrocell basestation. This may be addressed by relaying the synchronization signal across several nodes to the remote network node, but this introduces inaccuracies.

Furthermore, in the case of multiple-operator deployments of TDD networks, the operators typically use different frequency bands to avoid interference. However, this is not completely effective so they must still adopt the same frame structure and synchronize their time slots. Whilst this reduces interference, some operators may have to use a frame structure which is not ideally suited to their network demands.

It is therefore desirable to alleviate some or all of the above problems.

SUMMARY

According to a first aspect of the disclosure, there is provided a method of aligning a transmission frame in a Time Division Duplexing (TDD) network, wherein the transmission frame includes a sequence of units separated by transition points, wherein a transition point is a transition between uplink and downlink transmission and each unit includes one or more resource slots in either the uplink or downlink, the method comprising: allocating a transmit power level to a plurality of resource slots in a unit, wherein a transmit power for a first resource slot of the plurality of resource slots is greater than the transmit power for a second resource slot of the plurality of resource slots; measuring the transmit power of a TDD transmission received from an external node to determine a peak transmit power of the received TDD transmission; and substantially aligning the first resource slot to coincide with the peak transmit power of the received TDD transmission.

The present disclosure therefore provides an alternative technique to align TDD transmission frames. The method may embed a synchronization signal within the TDD frame by allocating a higher transmit power to a resource slot (e.g. a timeslot) within the frame. A received TDD transmission (i.e. received from an external node implementing the same technique) may then be analyzed to determine when the peak power level occurs, and the transmission frame may be synchronized with the received TDD transmission by aligning the resource slot having the higher transmit power to coincide with the peak transmit power of the received TDD transmission. The timeslots having the higher transmit power will therefore occur at the same time and the transmissions are thus synchronized. By implementing this technique, it is shown that two transmissions having the same frame structure may be aligned to eliminate interference. Furthermore, using increased power levels as a synchronization signal allows all resources to be used for transmitting data (rather than having part of the resources dedicated to a synchronization signal, as used in the prior art). The present disclosure thus provides greater spectrum usage than the prior art.

The first resource slot may be positioned substantially at a center of the plurality of resource slots. Furthermore, the second resource slot may be adjacent a transition point with another unit in the sequence of units, and the transmit power level allocated to the second resource slot may be lower than the transmit power levels for each of the plurality of resource slots. Accordingly, if overlapping timeslots remain after the alignment step (e.g. due to imperfect alignment), the power levels of these timeslots may be relatively low to minimize interference. Furthermore, in some scenarios this allows the two TDD transmissions to use different frame structures (which may be optimized for each network), without causing excessive interference. There is also no need for a time guard at the transition point between uplink and downlink timeslots.

The transmit power levels allocated to the plurality of resource slots in the unit may decrease with distance from the center of the unit.

Also provided is a computer program containing computer-executable code which, when executed on a computer, causes the computer to perform the method of the first aspect of the disclosure.

According to a second aspect of the disclosure, there is provided a device for a Time Division Duplexing (TDD) network, the device comprising a receiver adapted to receive a TDD transmission from an external device; a processor adapted to configure a transmission frame, the transmission frame including a sequence of units separated by transition points, wherein a transition point is a transition between uplink and downlink transmission and each unit includes one or more resource slots in either the uplink or downlink; and a power measurement module adapted to measure the power level of the received TDD transmission and determine a peak power level, wherein the processor is further adapted to: allocate a transmit power level to a plurality of resource slots in a unit of the transmission frame, wherein a transmit power for a first resource slot of the plurality of resource slots is greater than the transmit power for a second resource slot of the plurality of resource slots; and substantially align the first resource slot to coincide with the peak transmit power of the received TDD transmission.

The first resource slot may be positioned substantially at a center of the plurality of resource slots.

The second resource slot may be adjacent a transition point with another unit in the sequence of units, and the transmit power level allocated to the second resource slot may be lower than the transmit power levels for each of the plurality of resource slots.

The transmit power levels allocated to the plurality of resource slots in the unit may decrease with distance from the center of the unit.

The power measurement module may be part of the processor, and the device may be a small cell.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
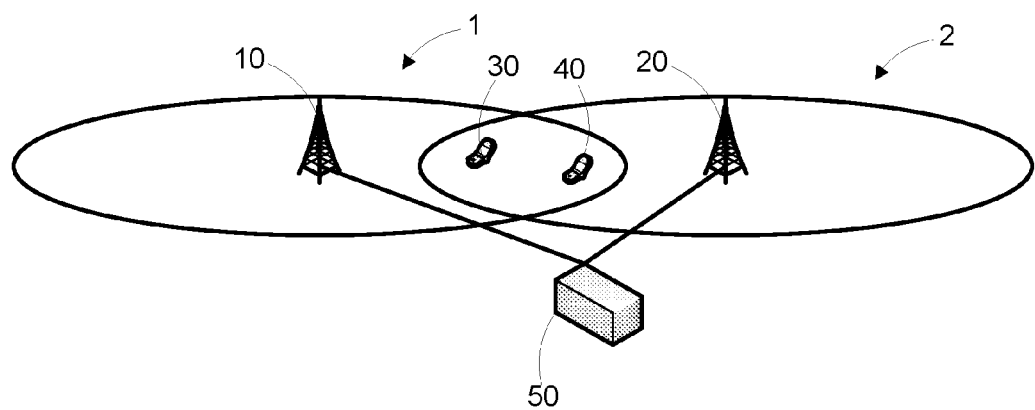
FIG. 1 is a diagram illustrating a first and second TDD network, and a basestation controller of a first embodiment of the present disclosure.
Figure 2:
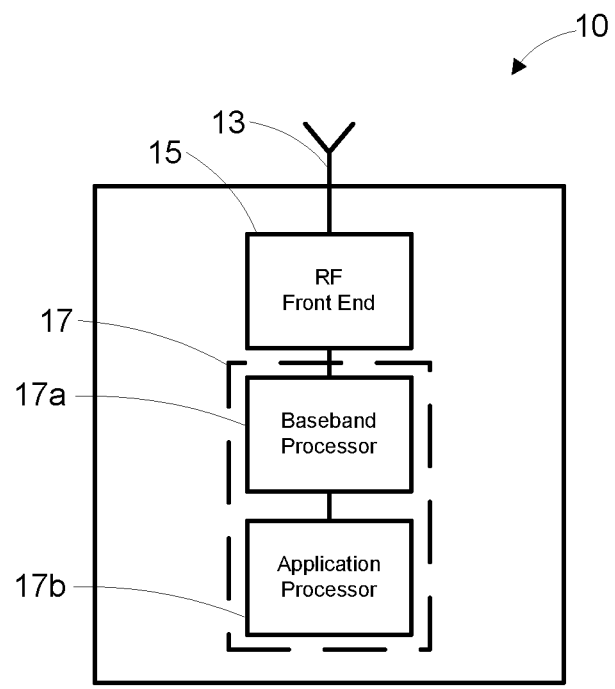
FIG. 2 is a schematic diagram of a basestation of the first network of FIG. 1.
Figure 3:
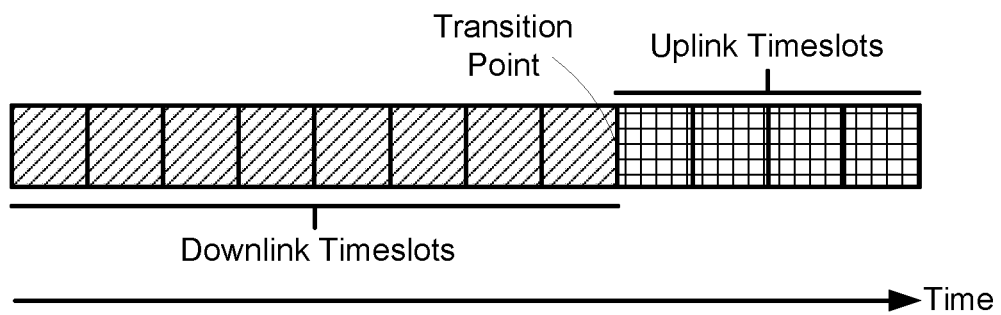
FIG. 3 is a diagram illustrating a TDD transmission.

A first embodiment of the present disclosure will now be described with reference to FIGS. 1 to 11. FIG. 1 illustrates a first and second TDD network 1, 2, each including a basestation 10, 20 and a User Equipment (UE) 30, 40, and a basestation controller 50. FIG. 2 is a schematic diagram of a first basestation 10 (and the skilled person will appreciate that the second basestation 20 is substantially the same), including an antenna 13, an RF front end 15, and a processor 17 (including a baseband processor 17a and an application processor 17b). The first basestation 10 also includes a scheduler adapted to configure a frame for TDD transmissions between the basestation 10 and the plurality of UEs 30, 40 (an example frame structure is shown in FIG. 3). In this embodiment, the scheduler is implemented in the application processor 17b, which is also configured to send the scheduling information, including the frame structure, to the plurality of UEs 30, 40.

Figure 4:
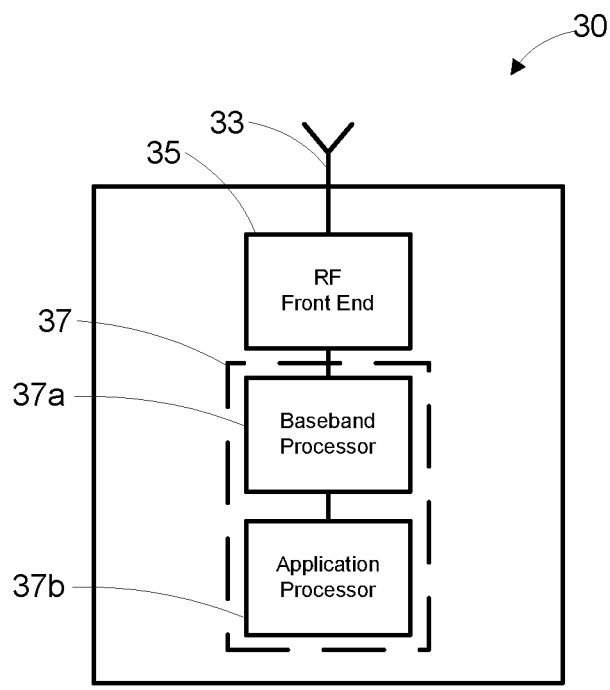
FIG. 4 is a schematic diagram of a UE of the first network of FIG. 1.

A schematic diagram of a first UE 30 is shown in FIG. 4 (and the skilled person will appreciate that the second UE 40 is substantially the same). The first UE 30 includes an antenna 33, an RF front end 35, and a processor 37 (including a baseband processor 37a and an application processor 37b). The first UE 30 is camped on the first TDD network 1 and is adapted to receive and implement the scheduling information from the first basestation 10. Similarly, the second UE 40 is camped on the second TDD network 2 and is configured to receive and implement scheduling information from the first basestation 10.

Figure 5A:
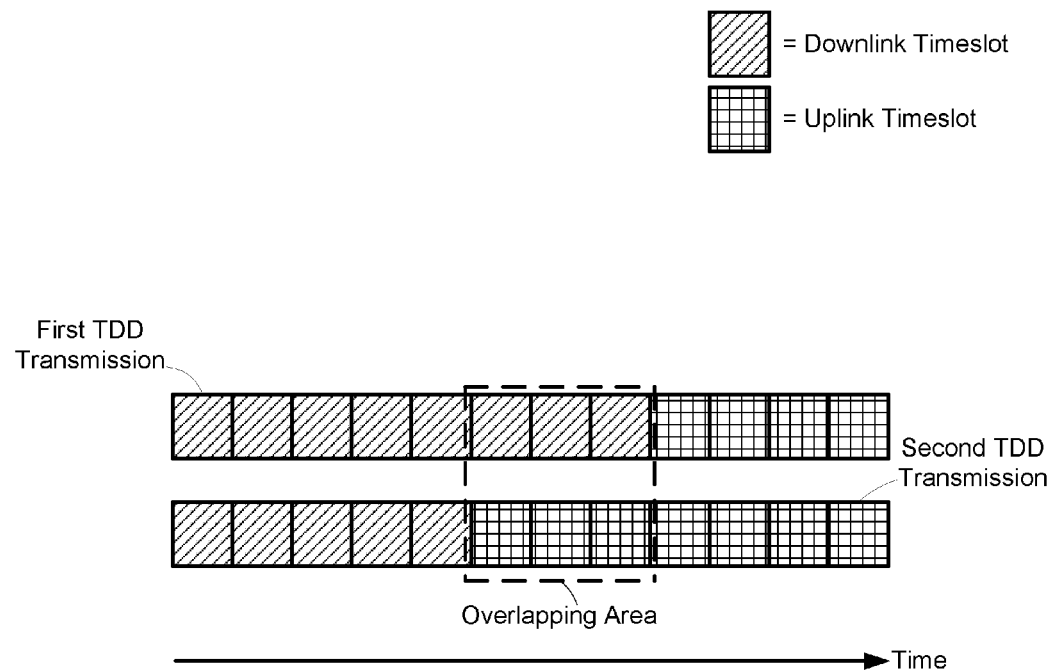
FIG. 5a is a diagram illustrating two TDD transmissions having a conflict area due to different frame structures.
Figure 5B:
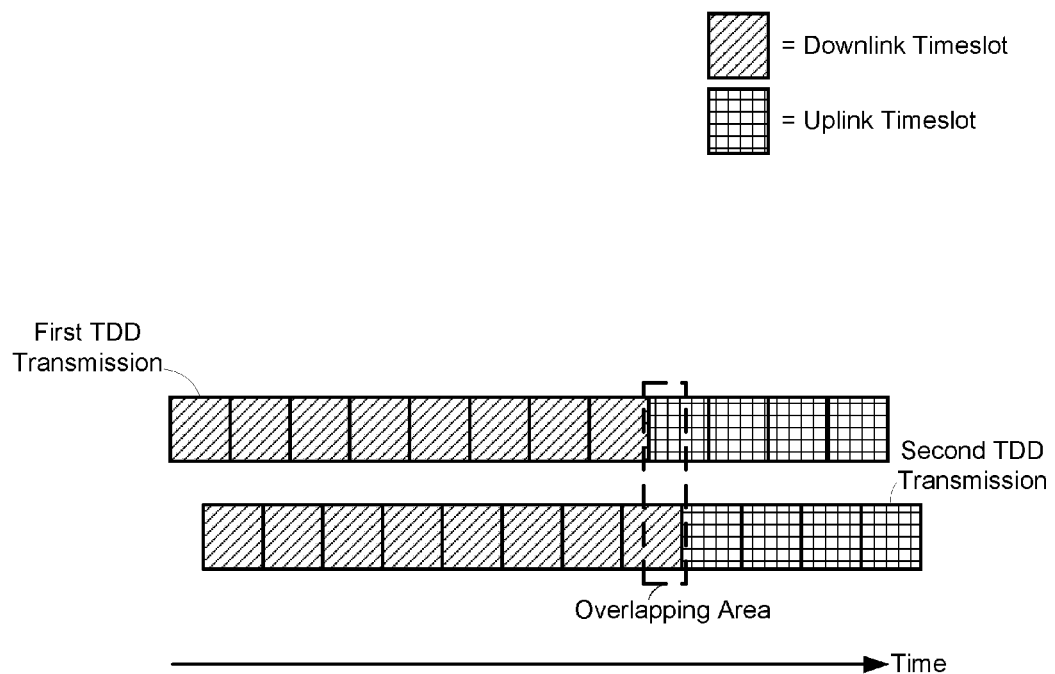
FIG. 5b is a diagram illustrating two TDD transmissions having a conflict area due to misaligned transition points.
Figure 6:
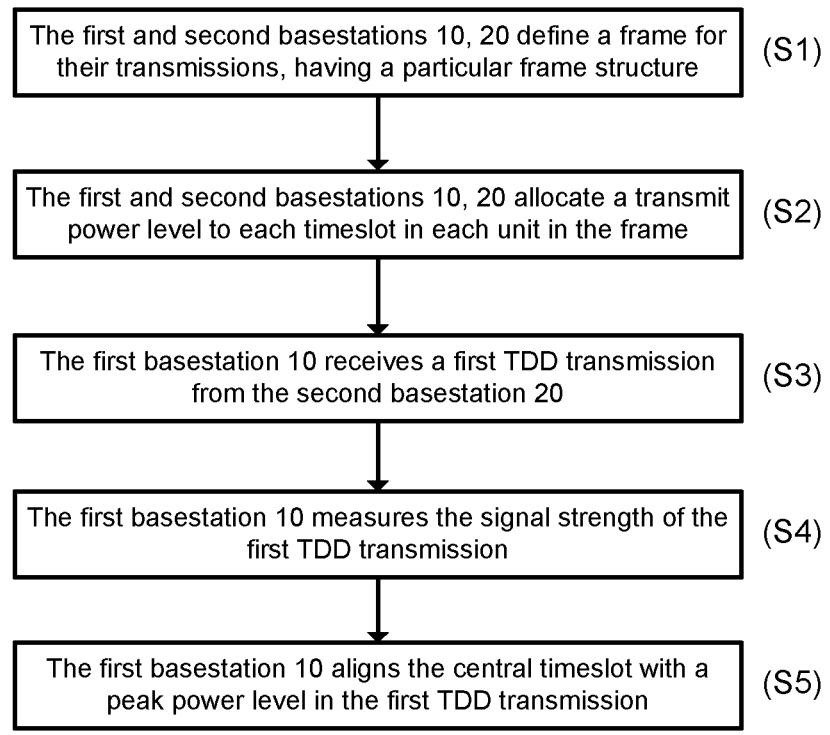
FIG. 6 is a flow diagram illustrating a method of the first embodiment of the present disclosure.

As is known in the art, significant interference will occur if two TDD transmissions have overlapping downlink and uplink timeslots. An example of TDD transmission interference is illustrated in FIG. 5a, which shows a frame structure of a first TDD transmission from the first basestation 10 to the first UE 30 and a frame structure of a second TDD transmission from the second basestation 20 to the second UE 40. As shown in the Figure, the first and second TDD transmissions are synchronized (i.e. their transition points occur at the same time), but as they use different frame structures there is an overlapping portion of time in which the first basestation 10 is transmitting whilst the second basestation 20 is receiving. The transmissions from the first basestation 10 to the first UE 30 will therefore significantly interfere with any transmissions being sent from the second UE 30 to the second basestation 20. Alternatively or additionally, there may be overlapping downlink and uplink timeslots if the first and second TDD transmissions are not synchronized (even if they use the same frame structure, as shown in FIG. 5b).

To minimize this interference, the application processors 17b, 27b of the first and second basestations 10, 20 align their transmissions according to a method of the present disclosure. A first embodiment of a method of the present disclosure will now be described, with reference to the flow chart of FIG. 6 and the transmission diagrams in FIGS. 7 to 11.

First (at S1), the application processors 17b, 27b define a frame for its transmission having a particular frame structure. Each unit in the frame is dedicated to either uplink or downlink and comprises one or more timeslots. The frame has a plurality of transition points between the units, during which the basestations 10, 20 may switch between transmit/ receive mode. The frame structures may be selected to have particular uplink/downlink ratios that are most suited to the first and second network's 1, 2, such that the networks 1, 2 have sufficient capacity in both the uplink and downlink directions. Accordingly, if the first basestation 10 is mostly used for voice traffic, whilst the second basestation 20 is mostly used for data traffic being sent to the second UE 30, the uplink/downlink ratio for the first basestation 10 may be even whilst the uplink/downlink ratio for the second basestation 20 may be skewed to provide more downlink timeslots. The frame structures for all TDD transmissions should have an identical length (e.g. 5 ms, 10 ms).

The application processors 17b, 27b allocate a transmit power level to each timeslot in each unit of the frame (at S2). In this embodiment, the application processors 17a, 27b allocate transmit powers to each unit such that timeslots closer to the transition points have lower transmit powers than timeslots closer to the center of the unit. The first and second basestations 10, 20 may then transmit signals using these transmit power levels for each timeslot. The baseband processors 17a, 27b may adapt the power levels of each timeslot for the signal for transmission via the antennae 13, 23.

Figure 7:
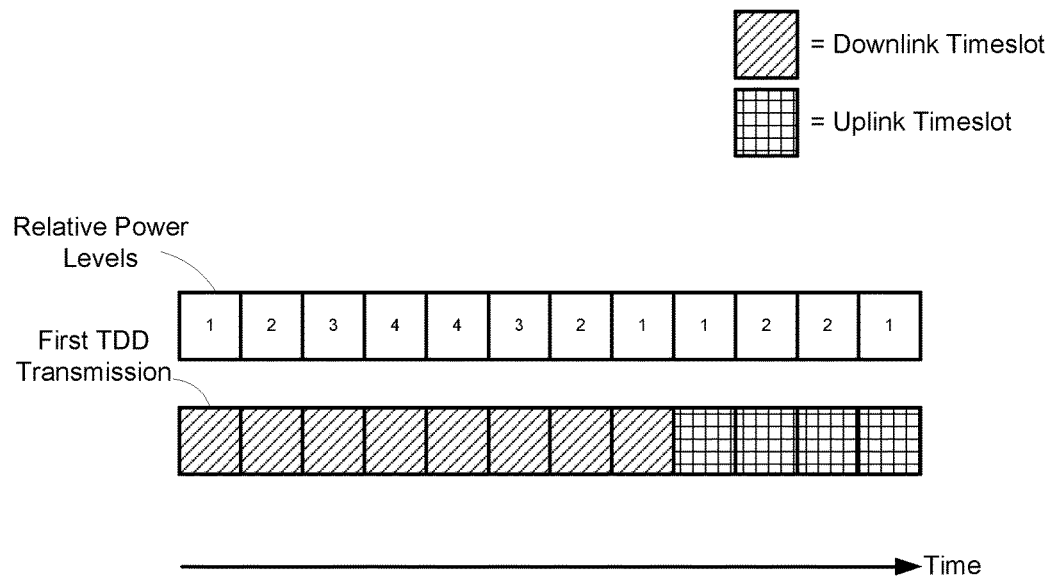
FIG. 7 is a diagram illustrating a TDD transmission having a plurality of timeslots and relative power levels for each timeslot.

FIG. 7 illustrates a TDD frame having uplink and downlink units, and a transition point between the two units. FIG. 7 also shows the relative power levels of each time slot. The transmit power level decreases with distance from the center of each unit, such that the transmit power levels for the timeslots at the center of the unit are the highest, whilst the transmit power levels for the timeslots at the edge of the unit are the lowest.

Next (at S3), the first basestation 10 receives a first TDD transmission from the second basestation 20 (e.g. during a cell sniffing operation). The first basestation 10 then measures the signal strength of the first TDD transmission (at S4), and determines when a peak power level occurs (thus corresponding to the timeslots at a center of the unit for that transmission).

Figure 8:
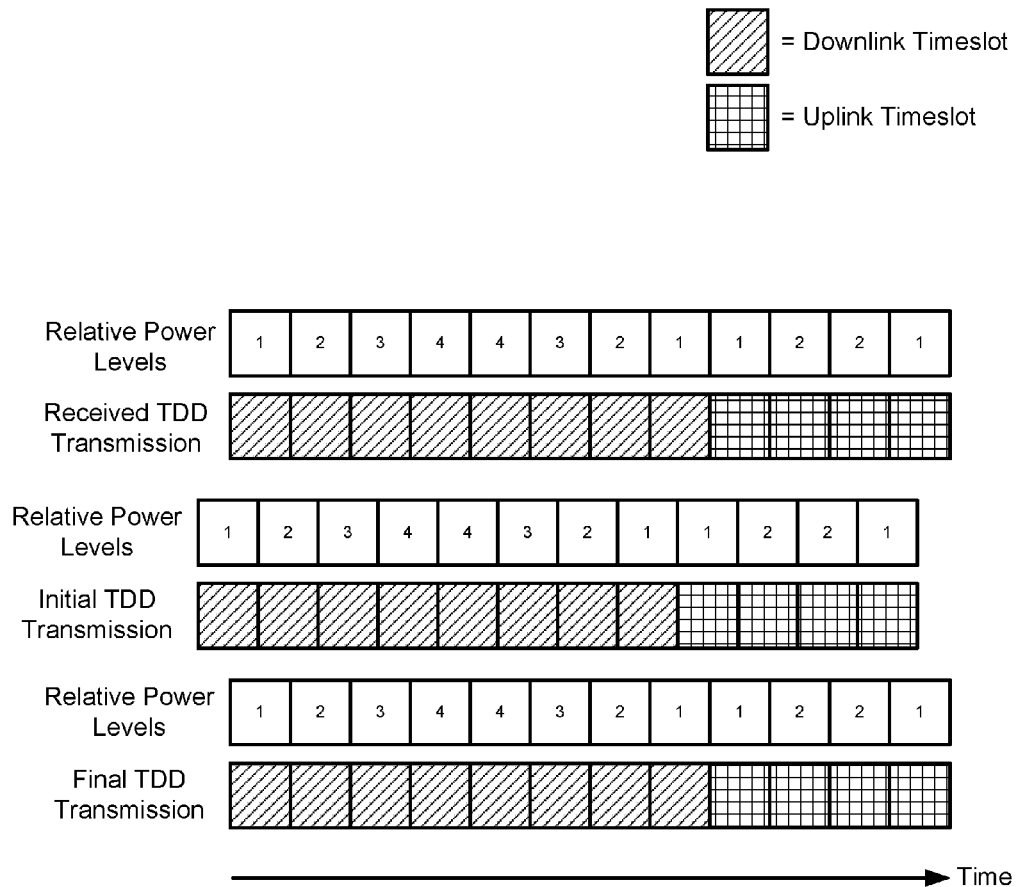
FIG. 8 is a diagram illustrating the alignment of the TDD transmission of FIG. 7 with a received TDD transmission, wherein the two TDD transmissions have the same frame structures and are synchronized after the alignment.

The first basestation then aligns its frame structure such that the central timeslot of a unit (i.e. having the greatest transmit power) coincides with the peak power level in the first TDD transmission (at S5). This may be achieved by introducing a delay before the next frame is transmitted. A first example of transmissions from the first and second basestations 10, 20 after this alignment are shown in FIG. 8. In this example, the first and second basestations 10, 20 both use the same frame structures and, by virtue of the alignment, the transition points occur at the same time. Accordingly, there is no interference between the two transmissions as there is no overlapping uplink/downlink portion.

The present disclosure therefore provides a method of synchronizing transmissions when two TDD networks use the same frame structure.

Figure 9:
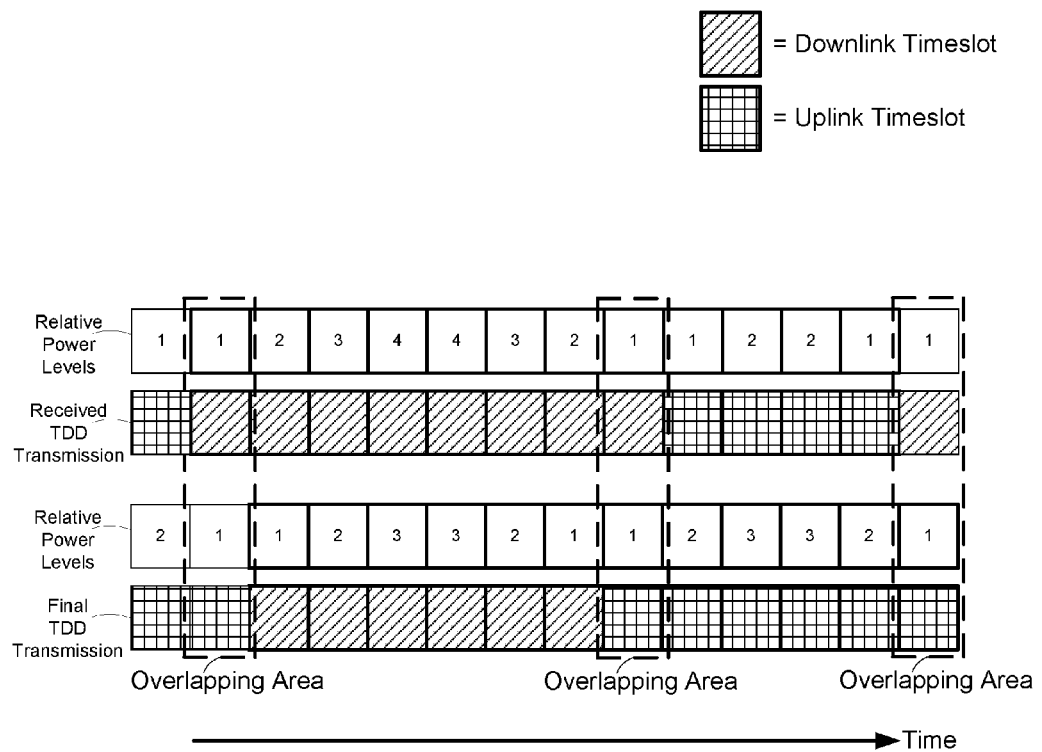
FIG. 9 is a diagram illustrating the alignment of the TDD transmission of FIG. 7 with a received TDD transmission, wherein the two TDD transmissions have different frame structures and are synchronized after the alignment.

A second example of transmissions from the first and second basestations 10, 20 after the alignment is shown in FIG. 9, which illustrates a sequence of frames for each transmission (wherein one frame is highlighted with thicker borders for the purposes of this description). In this example, the first and second basestations 10, 20 use different frame structures, such that there are overlapping areas of uplink and downlink timeslots after the alignment. However, as the central timeslots within a unit are aligned with each other, the overlapping portions include timeslots which have been allocated lower transmit power levels. Accordingly, the interference experienced during the overlapping portion is less than the interference experienced in overlapping portions of transmissions in the prior art.

In this example, the present disclosure provides a method of approximately synchronizing the two TDD networks. Although this results in a small amount of interference between transmissions from the two TDD networks, each network may use a frame structure that suits its network demands and the reduced transmit power levels during the overlapping portions minimizes the resulting interference.

Figure 10:
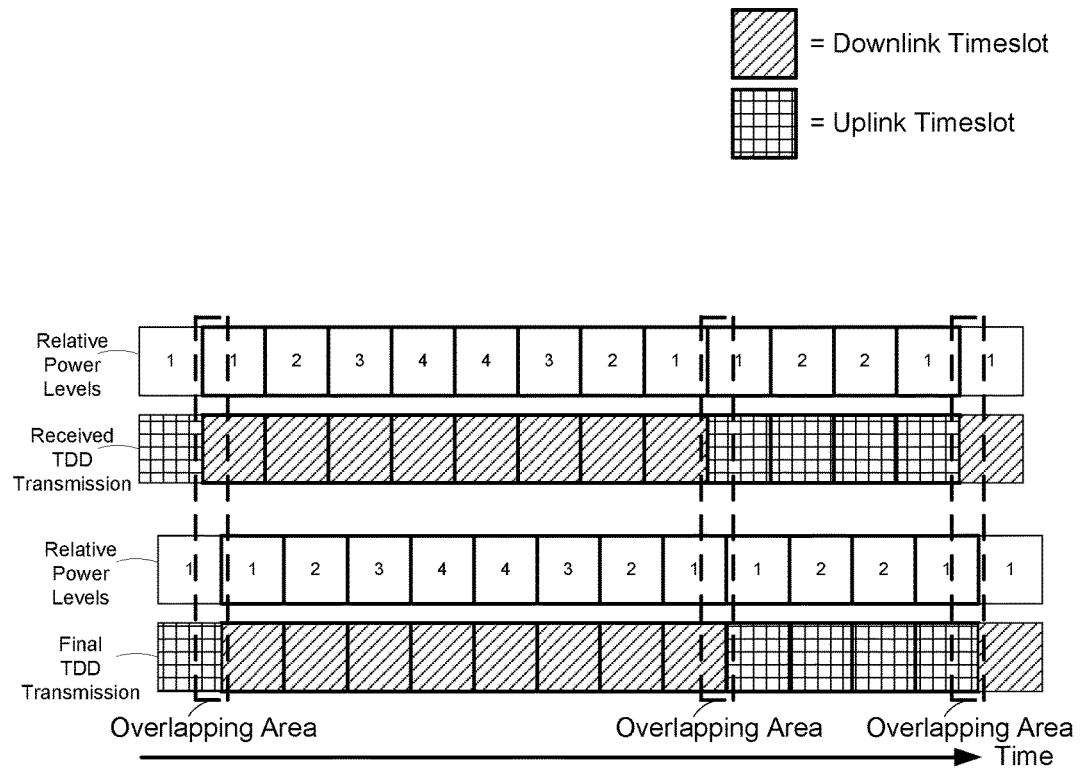
FIG. 10 is a diagram illustrating the alignment of the TDD transmission of FIG. 7 with a received TDD transmission, wherein the two TDD transmissions have the same frame structures and are substantially synchronized after the alignment.

A third example of transmissions from the first and second basestations 10, 20 after the alignment is shown in FIG. 10. In this example, the first and second basestations 10, 20 use the same frame structures but the transition points are only substantially synchronized after the alignment, such that overlapping portions remain. Again, as the central timeslots within a unit are substantially aligned with each other, the overlapping portions include timeslots which have been allocated lower transmit power levels. Accordingly, the interference experienced is less than the interference experienced in the overlapping portions of transmission in the prior art.

Figure 11:
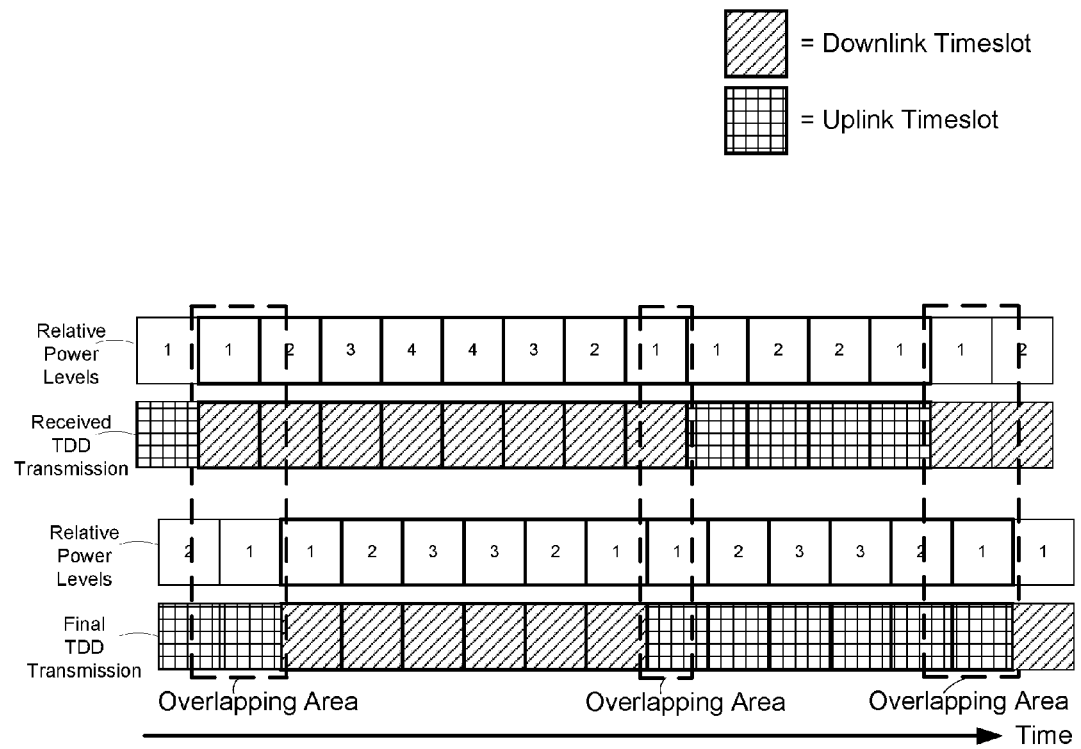
FIG. 11 is a diagram illustrating the alignment of the TDD transmission of FIG. 7 with a received TDD transmission, wherein the two TDD transmissions have different frame structures and are substantially synchronized after the alignment.

A fourth example of transmissions from the first and second basestations 10, 20 after the alignment is shown in FIG. 11. In this example, the first and second basestations 10, 20 use different frame structures and the transition points are only substantially synchronized after the alignment, such that overlapping portions (of different sizes) remain. Again, as the central timeslots within a unit are substantially aligned with each other, the overlapping portion includes timeslots which have been allocated lower transmit power levels—producing a negligible amount of interference on the network.

The skilled person will understand that the method of the present disclosure allows a basestation to synchronize its TDD transmissions with other nearby basestations. This may occur if the basestation is not able to synchronize via another method (e.g. poor GNSS signal, a failed backhaul synchronization, or being located outside a macrocell's coverage area), or it may be used as a standalone method.

In this embodiment, the basestation controller 50 is configured to allow the first basestation 10 to synchronize with the second basestation's 20 signals, and prohibit the second basestation 20 from synchronizing with the first basestation's 10 signals. This may be achieved by the basestation controller 50 having a reference synchronization signal, and being configured to compare the transmissions of the first and second basestations 10, 20 with this reference. Thus, in this embodiment, the second basestation 20 has a more accurate synchronization with the reference than the first basestation 10 (i.e. the time difference between its transition points and the reference is less than that of the first basestation 10). Accordingly, the basestation controller 50 causes the first basestation 10 to synchronize with the second basestation's 20 signals, and prevents the second basestation 20 from synchronizating with the first basestation's 10 signals.

The skilled person will understand that the basestation controller 50 is non-essential. In an alternative arrangement, at least one basestation may be designated as a 'master', whilst other basestations in the network may be designated as a 'slave.' Thus, both the master and slave basestations allocate different transmit power levels to different time slots (as noted above), but only the 'slave' basestations will align their frames with the received TDD transmission. This ensures that all basestations will synchronize with the master basestation's frame structure and timing.

In a further alternative arrangement, the first and second basestation's 10, 20 may have a memory configured to store representations of transmissions from various other basestations. The basestation may then be configured to synchronize with a received transmission if it has less than a predetermined number of representations of transmissions (i.e. indicating that it is newly deployed) or if it has more than a threshold number of stored transmissions (each having an identical synchronization) stored in memory (indicating that the majority of basestations in the network have an alternative synchronization). The basestation may therefore realign its frame structure after receiving a certain threshold of transmissions each having the same synchronization.

In this embodiment, the frame structure is not specific to any particular protocol and a basic structure is used to aid understanding of the disclosure. However, the skilled person will understand that the invention is applicable to any type of TDD transmission, which may include frame structures with a more complicated mix of uplink and downlink timeslots. For example, the Long Term Evolution, LTE, 4G standard supports TDD transmissions, and includes 7 different frame structure options. Each frame structure in the LTE standard includes a plurality of subframes (each including two timeslots), wherein each subframe may be for uplink or downlink transmissions (or may be a special subframe, used for other purposes). The frame may include a sequence of one or more subframes before a transition point. The skilled person will understand that the present invention still applies to these frame structures as a 'unit' may include several timeslots spanning several subframes. The power levels for each timeslot may then be allocated, and the frame structures aligned as described above. A more detailed account of the present disclosure when applied to the LTE TDD system will now be described with reference to the second embodiment, as shown in FIGS. 12 to 18.

Figure 12:
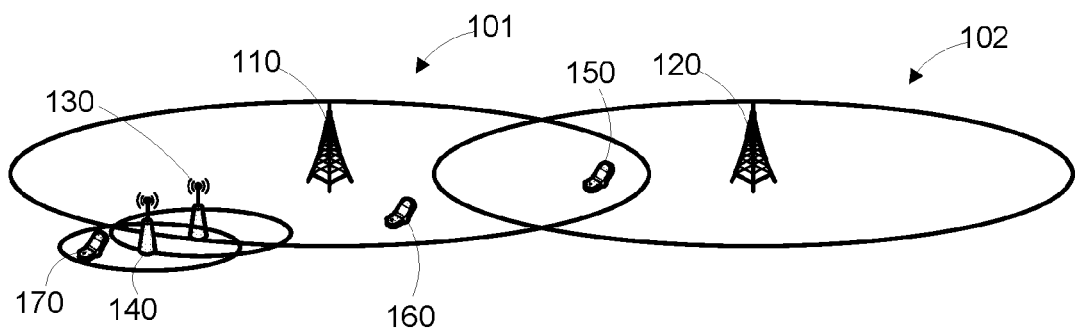
FIG. 12 is a diagram illustrating a first and second LTE-TD network of a second embodiment of the present disclosure.

FIG. 12 illustrates a first and second TDD network 101, 102 of the second embodiment, comprising a plurality of eNodeBs 110, 120, a plurality of femtocells 130, 140 and a plurality of UEs 150, 160, 170.

In this embodiment, the plurality of eNodeBs 110, 120 synchronize their transmissions using any applicable method (e.g. the method of the present disclosure, or a prior art method, such as OTA synchronization by GNSS). The first femtocell 130 is also able to synchronize its transmissions with the eNodeBs 110, 120 by any applicable method (e.g. the method of the present disclosure, or a prior art method). In this embodiment, the first and second UEs 150, 160 synchronize with the first and second eNodeBs 110, 120 (e.g. using the Primary Synchronization Signal, PSS, as is known in the art).

However, as shown in FIG. 12, the second femtocell 140 is outside the coverage area of the eNodeBs 110, 120, such that the femtocell 140 does not receive a PSS signal and cannot synchronize its transmissions via the prior art technique. As the coverage areas of the second femtocell 140 overlaps with the coverage areas of both the first eNodeB 110 and the first femtocell 130, there may be significant interference due to the second femtocell's 140 transmissions. Accordingly, the second femtocell 140 may synchronize its transmissions using the method of the present disclosure.

Figure 13:
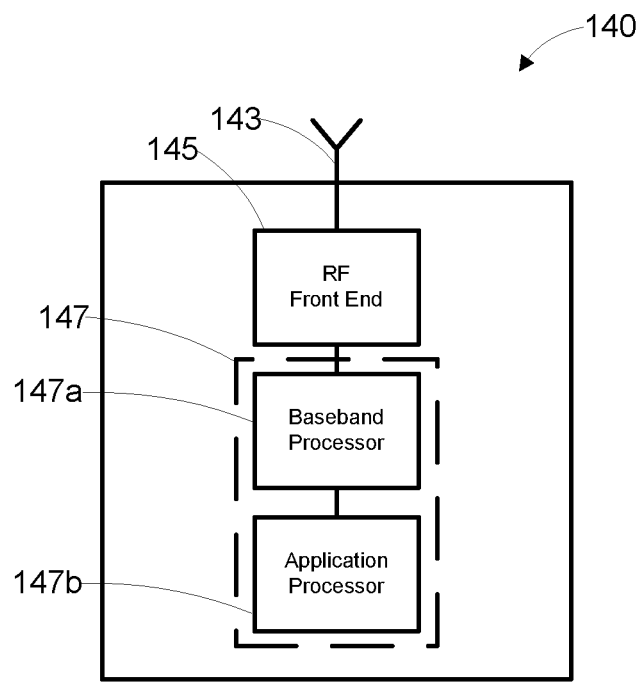
FIG. 13 is a schematic diagram of a femtocell of the LTE-TD network of FIG. 12.
Figure 14:
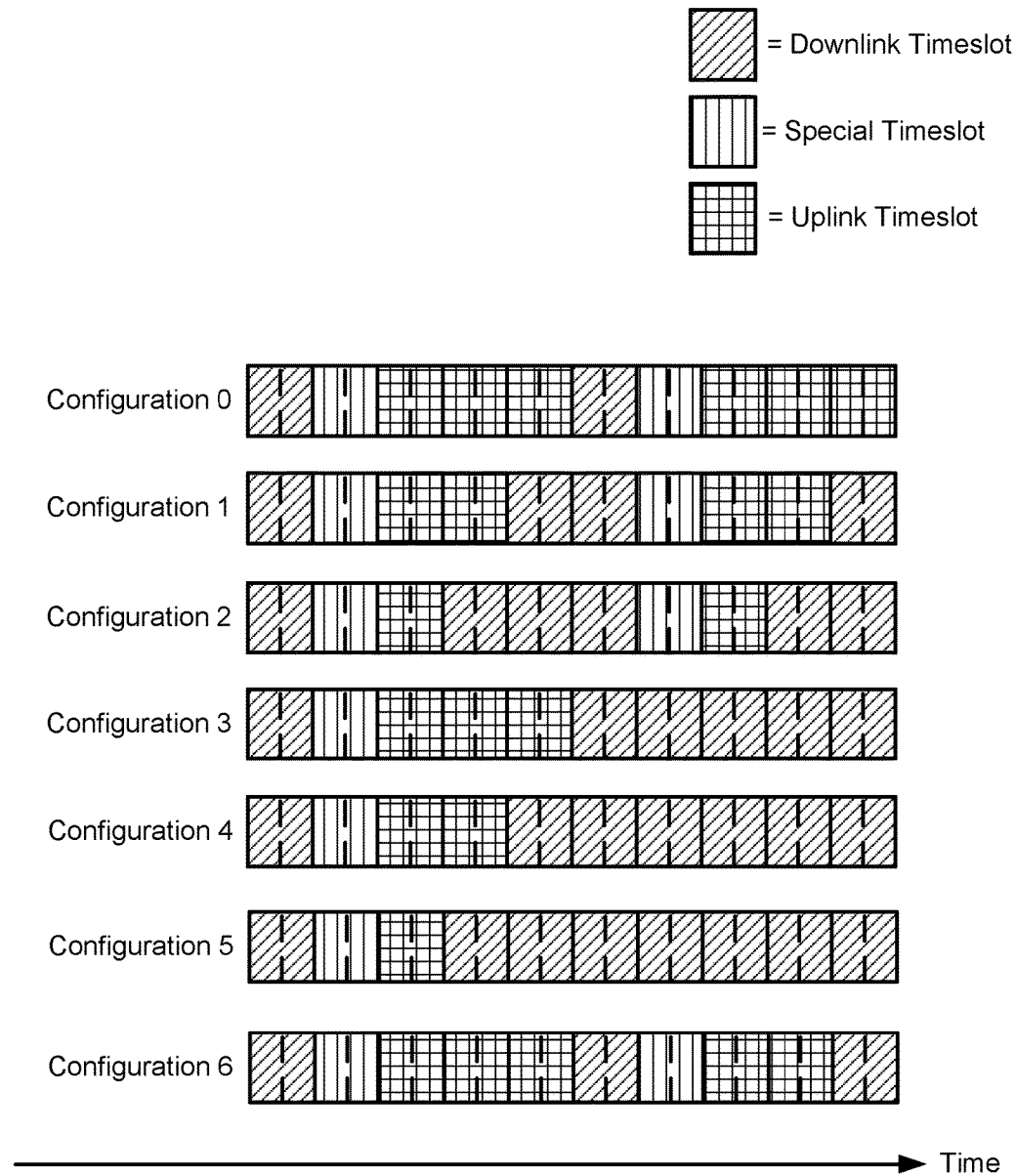
FIG. 14 is a diagram illustrating seven possible frame configurations for TDD transmissions in the LTE-TD network of FIG. 12.

A schematic diagram of the second femtocell 140 is shown in FIG. 13. The second femtocell 140 includes an antenna 143, an RF front end 145, and a processing module 147. The processing module 147 includes a baseband processor 147a and an application processor 147b. In this embodiment, the baseband processor 147a is adapted for communications in accordance with the LTE protocol stack (i.e. L1, MAC, RLC, PDCP, RRC). The skilled person will understand that the first femtocell 130 has a similar configuration, and the plurality of eNodeBs 110, 120 and the plurality of UEs 150, 160, 170 have a similar configuration to the plurality of basestations and UEs of the first embodiment of the present disclosure (but configured for LTE operation).

The application processor 147b acts as a scheduler (e.g. a MAC scheduler) for transmissions between the second femtocell 140 and first femtocell 130 and the third UE 170. The application processor 147b may therefore define the type of frame structure for the transmission (i.e. Frame structure 'Type 2' for TDD transmissions), and may allocate Resource Blocks within each timeslot in a frame. As is known in the art, the frame structure may have any one of the configurations defined in the table in FIG. 14, wherein each subframe contains two timeslots. In this embodiment, the application processor 147b selects frame structure configuration 0. Thus, the frame structure includes two downlink subframes (subframes 0 and 5), two special subframes (subframes 1 and 6) and two units of uplink subframes (a first unit including subframes 2 to 4, and a second unit including subframes 7 to 9).

The second femtocell 140 is also configured to send schedule information, including the frame structure and Resource Block allocation to the third UE 170.

Figure 15:
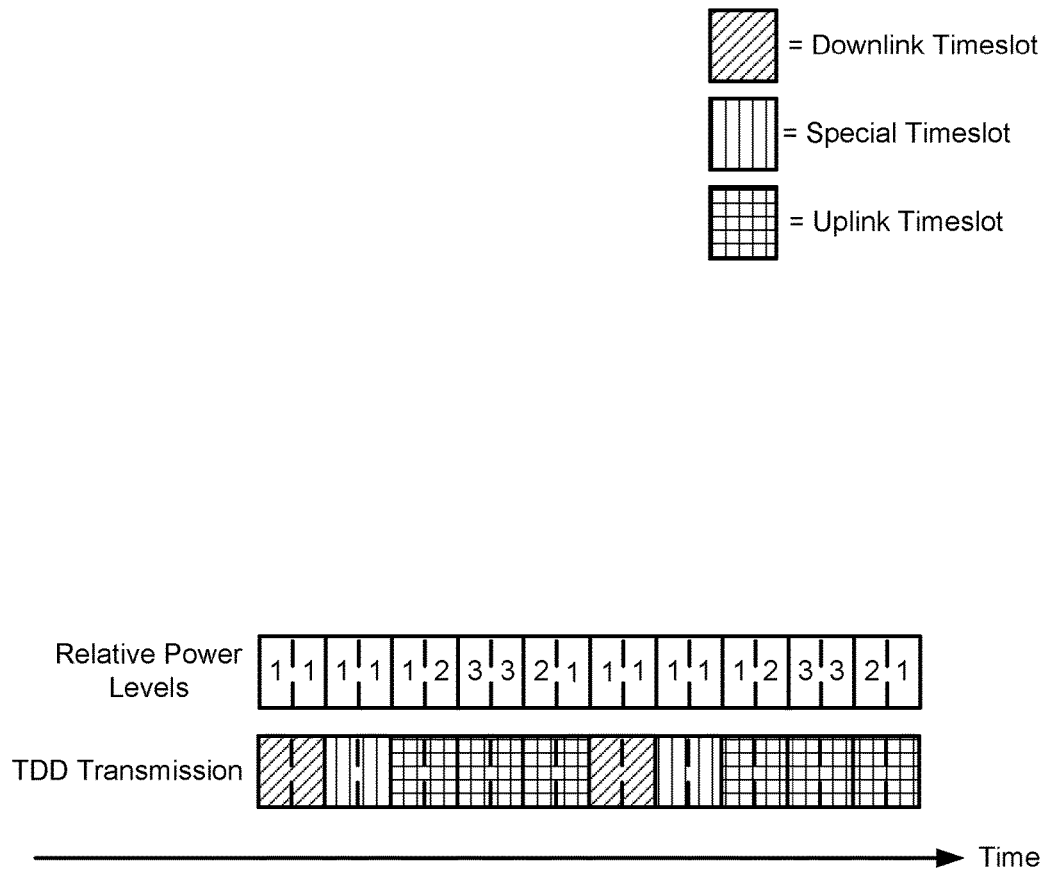
FIG. 15 is a diagram illustrating a TDD transmission of the LTE-TD network and relative power levels for each timeslot.
Figure 16:
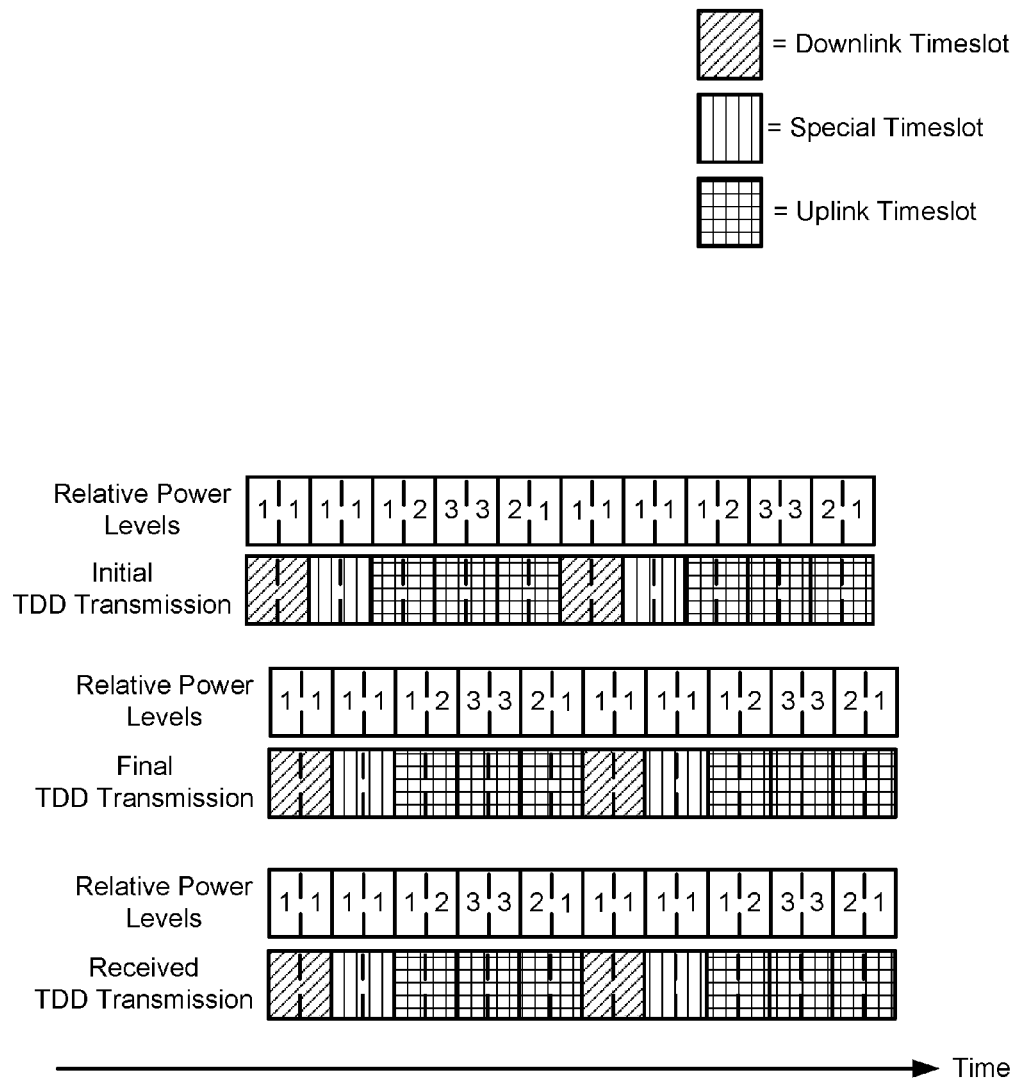
FIG. 16 is a diagram illustrating the alignment of the TDD transmission of FIG. 15 with a received TDD transmission, wherein the two TDD transmissions have the same frame structures and are synchronized after the alignment.

In this embodiment, the application processor 147b of the second femtocell 140 is adapted to synchronize its TDD transmissions by implementing a method of the present disclosure. Accordingly, the application processor 147b of the second femtocell 140 allocates different power levels to timeslots within each unit in the frame. As shown in FIG. 15, there are two units within the TDD frame—i.e. a first unit including three consecutive uplink subframes and a second unit including three consecutive uplink subframes. The six consecutive timeslots in both these units may therefore be allocated different transmit power levels such that the timeslots near the center of the unit have a greater transmit power level than timeslots near the edge of the unit (i.e. adjacent the transition point). The relative power levels for each timeslot in the first and second units are also shown in FIG. 15.

The second femtocell 140 may then receive a TDD transmission from the first femtocell 130, and align its transmissions by determining the peak signal power in the received TDD transmission and aligning its transmissions accordingly. In a first example (shown in FIG. 16), the second femtocell 140 is using the same frame structure as the first femtocell 130, such that the received TDD transmission includes two signal power peaks and the second femtocell 140 aligns the centers of two units with the two signal power peaks. This results in the TDD transmissions from both femtocells 130, 140 having no overlapping downlink and uplink timeslots, as they both use the same frame structure which are synchronized to have the same transition points. Thus, there is no interference between the two femtocells 130, 140.

Figure 17:
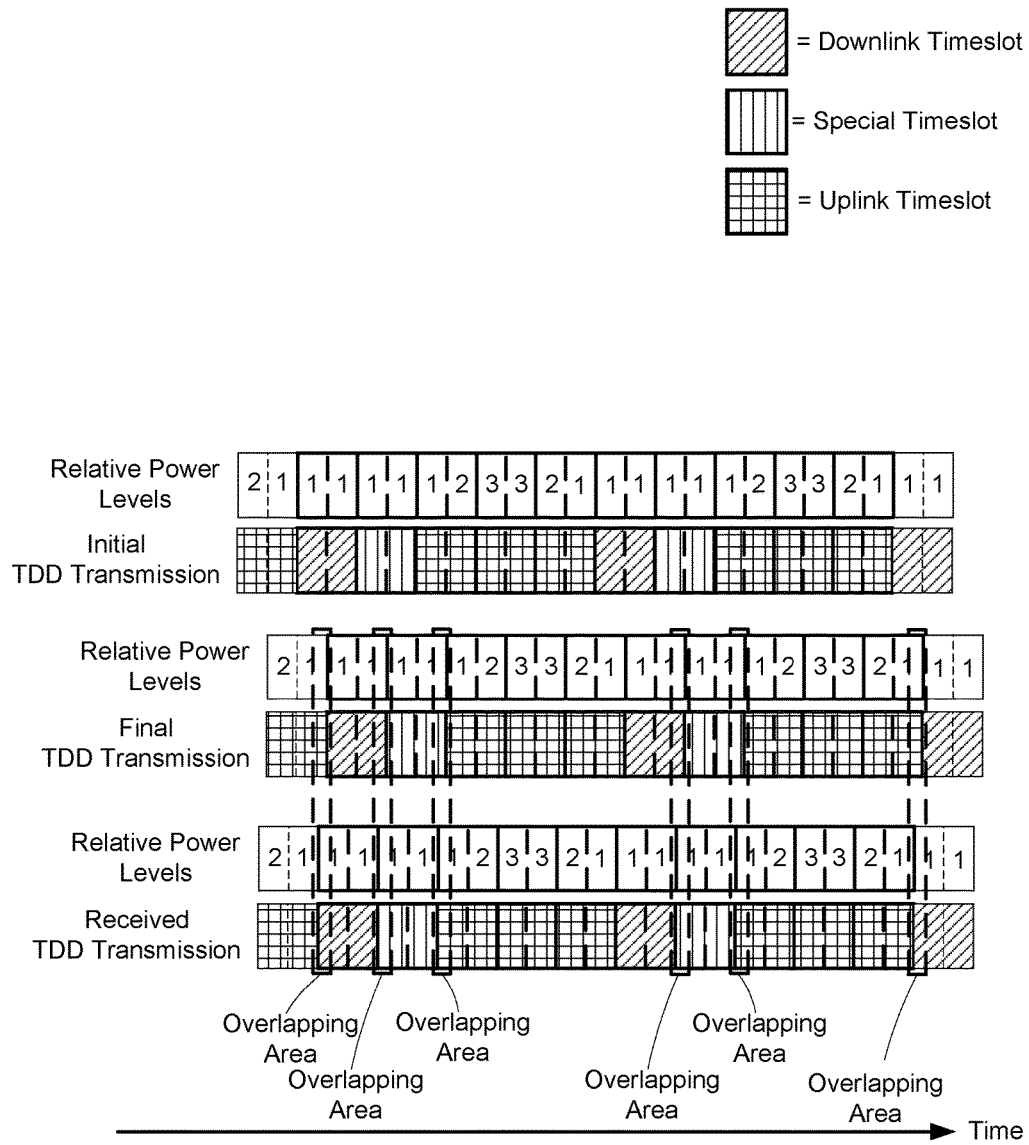
FIG. 17 is a diagram illustrating the alignment of the TDD transmission of FIG. 15 with a received TDD transmission, wherein the two TDD transmissions have the same frame structures and are substantially synchronized after the alignment.
Figure 18:
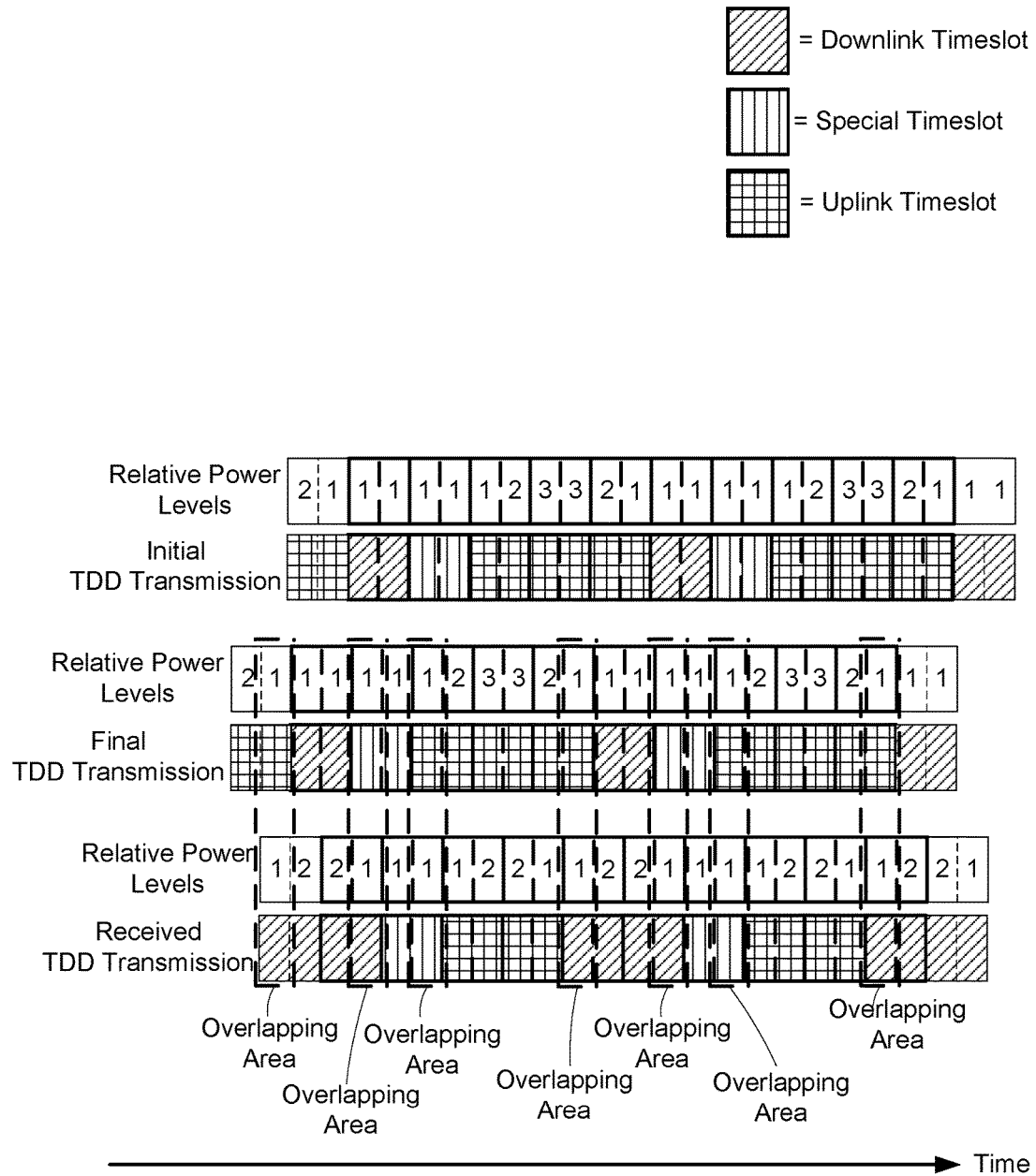
FIG. 18 is a diagram illustrating the alignment of the TDD transmission of FIG. 15 with a received TDD transmission, wherein the two TDD transmissions have different frame structures and are synchronized after the alignment.

FIG. 17 illustrates a second example of this embodiment, in which the second femtocell 140 is using the same frame structure as the first femtocell 130, but the frame structures are only substantially aligned after the alignment. As shown, there are small overlapping areas in which the first and second femtocells 130, 140 have differing timeslots at the same time, but the present disclosure minimizes interference as the power levels at these points are relatively low.

The first femtocell 130 may use a different frame structure to the second femtocell 140. Thus, in a third example of this embodiment (shown in FIG. 18), the first femtocell 140 uses frame structure configuration 1, including two uplink units (a first unit including subframes 2 and 3, and a second unit including subframes 7 and 8). The second femtocell 140 will therefore detect two signal power peaks in the TDD transmission received from the first femtocell 130, and may align the centers of the two units with these two signal power peaks. As the units in the frame structure configuration 0 are longer than the units in frame structure configuration 1, the two transmissions will only substantially synchronize after this alignment. Accordingly, there will be overlapping portions of uplink timeslots with downlink or special timeslots, but the transmit power levels of these timeslots will be sufficiently low that there is no significant interference in the network.

To further mitigate against interference in the network, the first and second femtocells 130, 140 may be further configured to only transmit outside the overlapping areas. However, this reduces the overall resource usage.

Once the second femtocell 140 has achieved synchronization with the first femtocell 130, it may transmit the scheduling information (including the frame structure and Resource Block allocation) to the third UE 170. The second femtocell 140 and the third UE 170 may then use the scheduling information to configure their own transmissions (e.g. at the application processors).

The skilled person will understand that the method of the present disclosure is suited to align transmissions between two nodes on the same layer of the network hierarchy (e.g. two eNodeBs or two femtocells), but is particularly relevant for synchronizing two femtocells. Unlike eNodeBs, femtocells are unlikely to have a GNSS module, and may not be able to rely on a backhaul connection or the eNodeB's PSS signal to synchronize (e.g. it may be outside the coverage area of the eNodeB). Accordingly, two femtocells may use the method of the present disclosure to synchronize their transmissions.

Furthermore, the skilled person will appreciate that the protocols mentioned in the embodiments are merely examples to aid understanding of the disclosure, and the method of the present disclosure may be applied to any suitable protocol. The present disclosure may also be applied to both wired and wireless TDD networks. For example, the method of the present invention may be applied to TD-SCDMA, IEEE 802.16 ("Wi-MAX"), G.fast DSL, and any other telecommunications network applying TDD.

In the above embodiments, a TDD transmission is described as comprising a sequence of "units" separated by transition points. The units are each dedicated to a particular transmission (e.g. uplink or downlink) and comprise at least one timeslot. The skilled person will understand that the unit may therefore cover one or more subframes within a frame. The method of the present disclosure involves allocating different power levels to the various timeslots within each unit, which is then used as a marker when aligning the timeslots between two transmissions. The skilled person will understand that the timeslot is not the only resource slot in the frame that may be allocated a power level. That is, various symbols within a timeslot may be allocated different power levels (e.g. the symbols at the center of the timeslot may be allocated a greater power level than the symbols near the edge of the timeslot).

Furthermore, in the above description, the transition points are situated between the units, which may be used to switch between transmit and receive modes of operation. However, the skilled person will understand that this is not essential—the frame may include further switching points (e.g. during one of the "special" subframes of the LTE-TD frame).

The varying power levels across the unit of timeslots in the TDD transmission are used to align two transmissions and reduce any interference caused by overlapping timeslots. In the above embodiments, the highest power levels are allocated to the central timeslots, and the lowest power levels are allocated to the timeslots at the edge of the unit. However, the skilled person will understand that this is not essential. That is, if the two TDD transmissions use the same frame structure, then allocating a higher power level to any timeslot in a first TDD transmission and aligning it with the peak power level in a second TDD transmission will achieve synchronization. However, by allocating lower power levels to timeslots closer to the edge of the unit, the resulting interference from overlapping timeslots due to the two TDD transmissions using different frame structures is minimized.

The present disclosure provides a method which may align or substantially align transmissions having either the same or different frame structures. When aligning different frame structures (which would result in an unacceptable amount of interference in the prior art), the present invention has the benefit of having relatively low transmit power levels to minimize interference on the network whilst allowing each basestation to use an optimal frame structure for its coverage area. However, the skilled person will understand that when the transmissions have very different frame structures, the present disclosure may mitigate the chances of interference by not transmitting at all during the overlapping areas. Such scenarios will be rare however, as Mobile Network Operators, MNOs, tend to set up their basestations to include the same frame structure.

Alternatively, the present disclosure may also include reconfiguring the frame structure of the TDD transmission to be identical or closely correlate with the received TDD transmission. Although this new frame structure may not be ideal for the network demands, it may reduce the amount of interference on the network.

Furthermore, the devices are configured to receive a TDD transmission from an external node, measure the power level of this signal, and align their transmission frames accordingly. The skilled person will understand that the devices may receive several TDD transmissions from several external nodes. In this arrangement, the devices may be further configured to determine which signal is the strongest, and use the strongest TDD transmission for the subsequent measurement and alignment. Alternatively, the devices may be further configured to take an average or weighted average based on the received transmissions.

In the above embodiments, the power levels for different timeslots are represented using relative numbers. The skilled person will understand that a macrocell basestation may have a power level at tens of thousands of Watts, whilst a small cell may only use tens of milliWatts total output power. Thus, the power levels for each timeslot are tailored to the particular application so a listening basestation can detect the greater power (a difference of around 3 dB would likely be sufficient). The skilled person will also understand that strict adherence to these relative values is not necessary, but are used as an illustration of how the power levels may vary across each unit in the frame.

In the second embodiment of the present disclosure, the TDD networks include a plurality of femtocells. The skilled person will understand that the method of the present disclosure is particularly applicable to femtocells, which may not readily synchronize with other elements in the network by the prior art techniques (such as by GNSS). The skilled person will also understand that the present disclosure is equally applicable to all forms of small cell, such as picocell, metrocell, etc.

In the above embodiments, the first and second basestations and femtocells are configured to measure the power level of received TDD transmissions. The skilled person will understand that this may be a function performed by the baseband processor or a dedicated power measurement module. Furthermore, the skilled person will understand that the scheduling function may be implemented by any processing module in the basestation/femtocell (whether dedicated or part of another processor).

In the above embodiments, the basestation aligns its frame structure such that the central timeslot of a unit (i.e. the timeslot having the greatest transmit power) coincides with the peak power level in the first TDD transmission by introducing a delay before the next frame is transmitted. However, the skilled person will understand that this is not the only way the timeslot may be aligned with the peak power level. For example, if a large adjustment is required, several smaller delays may be introduced to several subsequent frames, until it reaches alignment. In another example, the delay is introduced at a particular time, rather than the next frame. Furthermore, the basestation may reset to align with the peak power level.

The skilled person will understand that any combination of features is possible within the scope of the invention, as claimed.

The invention claimed is:

1. A method of aligning a transmission frame in a Time Division Duplexing (TDD) network, wherein the transmission frame includes a sequence of units separated by transition points, wherein a transition point is a transition between uplink and downlink transmission and each unit includes one or more resource slots in either the uplink or downlink, the method comprising:
    allocating a transmit power level to a plurality of resource slots in a unit, wherein a transmit power level for a first resource slot of the plurality of resource slots is greater than a transmit power level for a second resource slot of the plurality of resource slots;
    measuring the transmit power of a TDD transmission received from an external node to determine a time period when a peak transmit power of the received TDD transmission occurs; and
    aligning the first resource slot by shifting the first resource slot to coincide with a predetermined timeslot with respect to the time period when the peak transmit power of the received TDD transmission occurs.

2. The method as claimed in claim 1, wherein the first resource slot is positioned at a center of the plurality of resource slots.

3. The method as claimed in claim 1, wherein the second resource slot is adjacent to a transition point with another unit in the sequence of units, and the transmit power level allocated to the second resource slot is lower than the transmit power levels for each of the plurality of resource slots.

4. The method as claimed in claim 1, wherein the transmit power levels allocated to the plurality of resource slots in the unit decrease with distance from a center of the unit.

5. The method as claimed in claim 1, wherein the first resource slot is a timeslot.

6. The method as claimed in claim 1, further comprising:
a first device in the TDD network sending a signal to a second device in the TDD network, the signal being configured such that the first resource slot is aligned to coincide with the peak transmit power of the received TDD transmission.

7. A non-transitory computer-readable storage medium comprising a computer program containing computer-executable code which, when executed on a computer, causes the computer to perform the method of claim 1.

8. A device for a Time Division Duplexing (TDD) network, the device comprising:
a receiver adapted to receive a TDD transmission from an external device;
a processor adapted to configure a transmission frame, the transmission frame including a sequence of units separated by transition points, wherein a transition point is a transition between uplink and downlink transmission and each unit includes one or more resource slots in either the uplink or downlink; and
a power measurement module adapted to measure a transmit power level of the received TDD transmission and determine a time period when a peak transmit power level of the received TDD transmission occurs, wherein the processor is further adapted to:
allocate a transmit power level to a plurality of resource slots in a unit of the transmission frame, wherein a transmit power level for a first resource slot of the plurality of resource slots is greater than a transmit power level for a second resource slot of the plurality of resource slots; and
align the first resource slot by shifting the first resource slot to coincide with a predetermined timeslot with respect to the time period when the peak transmit power of the received TDD transmission occurs.

9. The device as claimed in claim 8, wherein the first resource slot is positioned at a center of the plurality of resource slots.

10. The device as claimed in claim 8, wherein the second resource slot is adjacent to a transition point with another unit in the sequence of units, and the transmit power level allocated to the second resource slot is lower than the transmit power levels for each of the plurality of resource slots.

11. The device as claimed in claim 8, wherein the transmit power levels allocated to the plurality of resource slots in the unit decrease with distance from a center of the unit.

12. The device as claimed in claim 8, wherein the first resource slot is a timeslot.

13. The device as claimed in claim 8, wherein the power measurement module is part of the processor.

14. The device as claimed in claim 8, being a small cell.

* * * * *

UNITED STATES PATENT AND TRADEMARK OFFICE
CERTIFICATE OF CORRECTION

PATENT NO. : 10,225,809 B2  
APPLICATION NO. : 15/300374  
DATED : March 5, 2019  
INVENTOR(S) : Mackenzie et al.

Page 1 of 1

It is certified that error appears in the above-identified patent and that said Letters Patent is hereby corrected as shown below:

In the Specification

Column no:01, Line(s):63: "Ethernet (SynchE)" to read as --Ethernet (SyncE)--

Column no:05, Line(s):55: "17b,27b" to read as --17b,37b--

Column no:05, Line(s):61: "17b,27b" to read as --17b,37b--

Column no:06, Line(s):12: "17b,27b" to read as --17b,37b--

Column no:06, Line(s):14: "17a,27b" to read as --17b,37b--

Column no:06, Line(s):20: "17a,27b" to read as --17a,37a--

Column no:07, Line(s):53: "synchronizating" to read as --synchronizing--

Signed and Sealed this
Eighth Day of October, 2019

Andrei Iancu
*Director of the United States Patent and Trademark Office*